No. 718,110. PATENTED JAN. 13, 1903.
S. S. EVELAND.
ANTIFRICTION END THRUST DEVICE.
APPLICATION FILED NOV. 30, 1901.
NO MODEL.

UNITED STATES PATENT OFFICE.

SAMUEL S. EVELAND, OF PHILADELPHIA, PENNSYLVANIA.

ANTIFRICTION END-THRUST DEVICE.

SPECIFICATION forming part of Letters Patent No. 718,110, dated January 13, 1903.

Application filed November 30, 1901. Serial No. 84,227. (No model.)

*To all whom it may concern:*

Be it known that I, SAMUEL S. EVELAND, a citizen of the United States, residing at Philadelphia, in the county of Philadelphia and State of Pennsylvania, have invented a certain new and useful Antifriction End-Thrust Device, of which the following is a specification.

The object is to provide an antifriction end-thrust device which will combine all the functions and advantages that obtain in the separate use of balls and rollers and which characterize and distinguish them from each other.

To the end stated the invention consists in the improvements hereinafter described and claimed.

The nature, characteristic features, and scope of the invention will be more clearly understood from the following description, taken in connection with the accompanying drawings, forming a part hereof, and in which—

Figure 1:
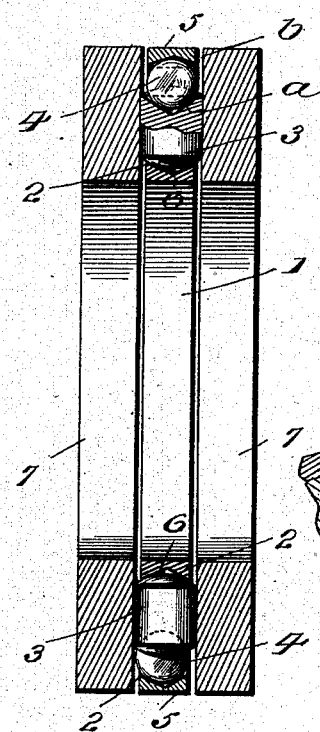
Figure 3:
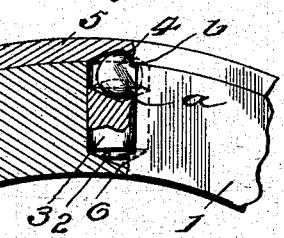
Figure 2:
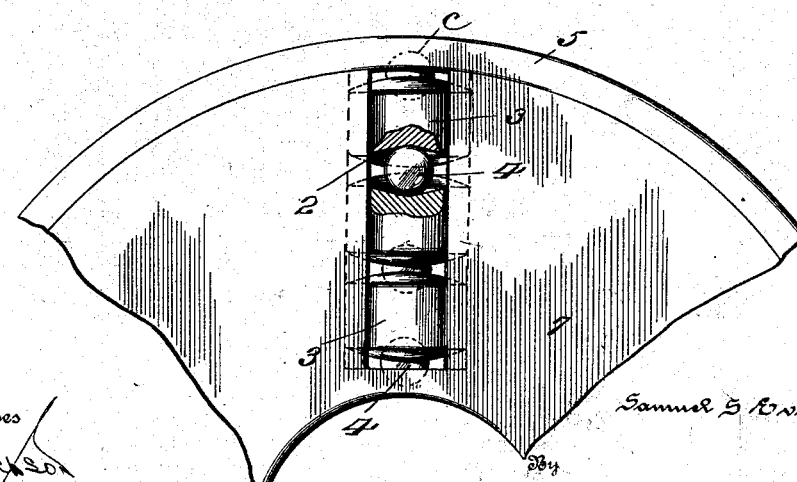

Figure 1 is a sectional view of an end-thrust device embodying features of the invention; and Fig. 2 is an elevational view of a modification, parts of the rollers being broken away to more clearly disclose the construction. Fig. 3 is a side elevational view of the bearing, disclosing the arrangement of the rollers and sockets.

Referring to Fig. 1, 1 indicates a ring, which has its periphery notched or provided with outwardly-opening slots or sockets 2, adapted for the reception of balls and rollers. 3 indicates the rollers, which throughout their length are cylindrical and at their outer ends are provided with concavities or sockets $a$ for the reception of the balls 4. A band or ring 5 serves the purpose of a retaining device for maintaining the balls and rollers in proper position. As shown, the band 5 may have a groove $b$ to accommodate the balls, and the sockets 2 may or may not have the auxiliary sockets 6 in the bottoms thereof to accommodate the inner ends of the rollers. 7 indicates similar coaxial rings or washers with hardened inner faces, which when used afford rolling contact to the protruding cylindrical faces of the rollers. The cylindrical parts or faces of the rollers take up end or longitudinal thrust, and the balls act to relieve radial pressure.

In the modified construction, Fig. 2, a plurality of balls and rollers is shown. The rollers 3 are socketed at their ends, as in Fig. 1, to accommodate the interposed balls, there being also a ball in the bottom of the main or radial socket 2. The band 5 is provided with individual sockets $c$ to accommodate the outer balls.

It will be obvious to those skilled in the art to which the invention appertains that modifications may be made in details without departing from the spirit and scope of the same. Hence I do not limit myself to the precise construction and arrangement of parts hereinabove described, and illustrated in the accompanying drawings; but, Having described the nature and objects of the invention, what I claim as new, and desire to secure by Letters Patent, is—

1. A thrust-bearing comprising a ring formed with a series of main sockets extending from the outer edge or periphery of the ring inwardly and which are open at their sides and have concave walls and auxiliary bottom sockets, cylindrical rollers confined in said main sockets and protruding at the sides thereof, balls arranged endwise of the rollers, and a ring fitted to the periphery of said first-mentioned ring and acting to confine the balls and rollers, substantially as described.

2. A thrust-bearing comprising a ring formed with a series of main sockets extending from the outer edge or periphery of the ring inwardly and which are open at their sides and have concave walls and auxiliary bottom sockets, cylindrical rollers with concaved ends confined in said main sockets and protruding at the sides thereof, balls arranged in the concaved ends of the rollers, and a ring fitted to the periphery of said first-mentioned ring and acting to confine the balls and rollers, substantially as described.

3. A thrust-bearing comprising a ring formed with a series of main sockets extending from the outer edge or periphery of the ring inwardly and which are open at their sides and have concave walls and auxiliary bottom sockets, cylindrical rollers with concaved ends confined in said main sockets and protruding at the sides thereof, balls arranged in the concaved ends of the rollers, a ring fitted to the periphery of said first-mentioned ring and acting to confine the balls and rollers, and coaxial rings or washers against which the protruding cylindrical faces of the rollers are afforded rolling contact, substantially as described.

4. A thrust-bearing comprising a ring formed with a series of main sockets extending from the outer edge or periphery of the ring inwardly and which are open at their sides and have concave walls and auxiliary bottom sockets, cylindrical rollers with concaved ends confined in said main sockets and protruding at the sides thereof, balls arranged in the concaved ends of the rollers, and a ring fitted to the periphery of said first-mentioned ring and acting to confine the balls and rollers and having a groove or raceway for the balls, substantially as described.

In testimony whereof I have hereunto signed my name in the presence of two subscribing witnesses.

SAMUEL S. EVELAND.

Witnesses:
W. J. JACKSON,
JAS. A. RICHMOND.